US008275698B2

(12) United States Patent
Boss et al.

(10) Patent No.: US 8,275,698 B2
(45) Date of Patent: Sep. 25, 2012

(54) TECHNOLOGY BUDGET MANAGER FOR MOBILE EMPLOYEES

(75) Inventors: Gregory J. Boss, American Fork, UT (US); Andrew R. Jones, Round Rock, TX (US); Kevin C. McConnell, Austin, TX (US); Alan P. Mitchell, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 892 days.

(21) Appl. No.: 12/054,906

(22) Filed: Mar. 25, 2008

(65) Prior Publication Data

US 2008/0167926 A1    Jul. 10, 2008

Related U.S. Application Data

(63) Continuation of application No. 11/008,538, filed on Dec. 9, 2004, now abandoned.

(51) Int. Cl.
*G06Q 40/00* (2012.01)
(52) U.S. Cl. ............................................ 705/38; 705/35
(58) Field of Classification Search ...................... 705/38
See application file for complete search history.

(56) References Cited

U.S. PATENT DOCUMENTS

| | | | |
|---|---|---|---|
| 5,579,242 A | 11/1996 | Fisher | |
| 5,684,965 A * | 11/1997 | Pickering | 705/34 |
| 6,009,408 A | 12/1999 | Buchanan | |
| 6,014,640 A | 1/2000 | Bent | |
| 6,321,078 B1 * | 11/2001 | Menelli et al. | 455/407 |
| 6,750,885 B1 | 6/2004 | Finch, II et al. | |
| 6,751,650 B1 | 6/2004 | Finch, II et al. | |
| 6,826,473 B1 * | 11/2004 | Burch et al. | 701/207 |
| 6,925,160 B1 * | 8/2005 | Stevens et al. | 379/121.05 |
| 7,069,240 B2 * | 6/2006 | Spero et al. | 705/30 |
| 7,333,594 B2 * | 2/2008 | Maes | 379/88.23 |
| 7,426,486 B2 * | 9/2008 | Treibach-Heck et al. | 705/32 |
| 2001/0042032 A1 * | 11/2001 | Crawshaw et al. | 705/32 |
| 2003/0120526 A1 * | 6/2003 | Altman et al. | 705/5 |
| 2004/0093519 A1 | 5/2004 | Grobman | |
| 2005/0097014 A1 | 5/2005 | Ebert | |
| 2005/0222854 A1 * | 10/2005 | Dale et al. | 705/1 |
| 2005/0222944 A1 * | 10/2005 | Dodson et al. | 705/39 |
| 2005/0289025 A1 * | 12/2005 | Fredericks et al. | 705/30 |
| 2006/0089891 A1 * | 4/2006 | Nigam | 705/34 |
| 2007/0219879 A1 * | 9/2007 | Furlong et al. | 705/30 |
| 2007/0267482 A1 | 11/2007 | Ruckart et al. | |
| 2008/0008303 A1 * | 1/2008 | Maes | 379/114.03 |
| 2008/0132201 A1 * | 6/2008 | Karlberg | 455/407 |

FOREIGN PATENT DOCUMENTS

JP    2002-373260 A    12/2002

* cited by examiner

*Primary Examiner* — Kirsten Apple
(74) *Attorney, Agent, or Firm* — Gibb & Riley, LLC (57) ABSTRACT

An automated system and method for budgeting technology expenses for an individual based on an objective standard, wherein the system comprises a database comprising a list of technologies used by the individual; a controller connected to the database, the controller being adapted to establish a monetary budget allotment for the individual corresponding to use of the technologies by the individual; at least one data component connected to the controller, the data component comprising specifications attributed to the individual, wherein the specifications comprise rules for defining the monetary budget allotment for the individual; and at least one monitor connected to the controller, the monitor being adapted to track dynamic parameters affecting the monetary budget allotment for the individual, wherein the individual comprises a mobile employee performing work-related duties for an organization.

31 Claims, 5 Drawing Sheets

TECHNOLOGY BUDGET MANAGER FOR MOBILE EMPLOYEES

CROSS-REFERENCE TO RELATED APPLICATIONS

This application is a Continuation of U.S. application Ser. No. 11/008,538 filed Dec. 9, 2004, the complete disclosure of which, in its entirety, is herein incorporated by reference.

BACKGROUND OF THE INVENTION

1. Field of the Invention

The embodiments of the invention generally relate to computer software and associated tools, and more particularly to a software tool used for a business or organization to manage its workforce.

2. Description of the Related Art

In traditional office environments, businesses (i.e., companies and other types of organizations) tend to pay all expenses for an employee who works on-site (i.e. overhead relating to printing supplies, office space, telephones, internet access, etc.). Currently, there is a trend to move employees from traditional offices to home offices (i.e., telecommuting), which helps in significantly decreasing office overhead costs. In some cases, this trend has resulted in upwards of 40% of traditional employees becoming mobile employees, especially for IT (information technology)-related businesses. The term "mobile employee" used herein describes an employee without a permanent physical business/organizational office, and who may work at home or telecommute from some other location.

Mobile employees tend to have different technology needs from those in a traditional business office and most of these needs involve tools and services (i.e., cell phones, wireless data networks, wireless handheld computers, internet access, etc.) which are provided externally. The associated expenses involved in providing these tools and services are variable and are often the first ones reduced when the business is reducing costs in difficult financial times.

The expense budgets and associated processes related to mobile employees are often inflexible and difficult to effectively manage and may even create employee satisfaction/unsatisfaction issues. When the manager or business policies dictate too much detail on expenses, the employee can be dissatisfied and the expense allocation becomes inefficient. Moreover, businesses and organizations are consistently looking for ways to attract and retain their employees and to monitor employee productivity in light of internal budget requirements. Furthermore, for mobile employees, these concerns remain in effect, but are often more complicated to manage. Therefore, there remains a need for an automated objective tool that enables business and/or organizational managers to equitably assign employees a technology budget based on work location attributes and job attributes and for intelligent monitors that examine an employee's work patterns.

SUMMARY OF THE INVENTION

In view of the foregoing, an embodiment of the invention provides an automated system for budgeting technology expenses for an individual based on an objective standard, wherein the system comprises a database comprising a list of technologies used by the individual; a controller connected to the database, the controller being adapted to establish a monetary budget allotment for the individual corresponding to use of the technologies by the individual; at least one data component connected to the controller, the data component comprising specifications attributed to the individual, wherein the specifications comprise rules for defining the monetary budget allotment for the individual; and at least one monitor connected to the controller, the monitor being adapted to track dynamic parameters affecting the monetary budget allotment for the individual, wherein the individual comprises a mobile employee performing work-related duties for an organization.

The data component comprises a location component comprising a work location code identifier corresponding to a location where the employee performs a majority of the work-related duties; and an attributes identifier corresponding to employee-related attributes including any of employee skill level, years of service with the organization, and job classification. The system further comprises an individual record component adapted to track expenses relating to the use of the technologies by the individual and to compare the tracked expenses with the monetary budget allotment; and an expense reporting component connected to the monitor, wherein the expense reporting component being adapted to facilitate a transaction between the employee and the organization for a reimbursement of expenses corresponding to the employee using personal resources of the employee for performance of the work-related duties.

The controller is adapted to fluctuate the monetary budget allotment of the individual based on the specifications and changes to the dynamic parameters. The monitor comprises a travel monitor adapted to track a travel frequency of the employee for performance of the work-related duties; a usage monitor adapted to track a usage of telephonic and data transfer devices by the employee during times of performance of the work-related duties by the employee; a rate changes monitor adapted to track changes in service provider fees for using the technologies; and a travel monitor adapted to track a frequency of the employee using a personal vehicle of the employee for performance of the work-related duties.

Another aspect of the invention provides a method for budgeting technology expenses for an individual based on an objective standard using a computer system, wherein the method comprises creating a list of technologies used by the individual; establishing a monetary budget allotment for the individual corresponding to use of the technologies by the individual; formulating specifications attributed to the individual, wherein the specifications comprise rules for defining the monetary budget allotment for the individual; and monitoring dynamic parameters affecting the monetary budget allotment for the individual, wherein the individual comprises a mobile employee performing work-related duties for an organization.

The method further comprises identifying a work location code corresponding to a location where the employee performs a majority of the work-related duties; identifying attributes corresponding to employee-related attributes including any of employee skill level, years of service with the organization, and job classification; tracking expenses relating to the use of the technologies by the individual; and comparing the tracked expenses with the monetary budget allotment.

Moreover, the method comprises fluctuating the monetary budget allotment of the individual based on the specifications and changes to the dynamic parameters; tracking a travel frequency of the employee for performance of the work-related duties; tracking a usage of telephonic and data transfer devices by the employee during times of performance of the work-related duties by the employee; tracking changes in service provider fees for using the technologies; tracking a frequency of the employee using a personal vehicle of the employee for performance of the work-related duties; and facilitating a transaction between the employee and the organization for a reimbursement of expenses corresponding to the employee using personal resources of the employee for performance of the work-related duties.

Another embodiment of the invention provides a program storage device readable by computer, tangibly embodying a program of instructions executable by the computer to perform a method of budgeting technology expenses for an individual based on an objective standard using a computer system, wherein the method comprises creating a list of technologies used by the individual; establishing a monetary budget allotment for the individual corresponding to use of the technologies by the individual; formulating specifications attributed to the individual, wherein the specifications comprise rules for defining the monetary budget allotment for the individual; and monitoring dynamic parameters affecting the monetary budget allotment for the individual.

Another embodiment of the invention provides a service for budgeting technology expenses for an individual based on an objective standard using a computer system; the service creating a list of technologies used by the individual; establishing a monetary budget allotment for the individual corresponding to use of the technologies by the individual; formulating specifications attributed to the individual, wherein the specifications comprise rules for defining the monetary budget allotment for the individual; and monitoring dynamic parameters affecting the monetary budget allotment for the individual.

The embodiments of the invention achieve several advantages including that the employee knows how much they can expense for technology tools and services; the business can plan a more effective budget for their employees; budget allocations are more equitable because of the use of an objective tool rather than a subjective process; and the use of "monitors" that track patterns which then adjust budgets according to policies.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for an automated objective tool that enables business and/or organizational managers to equitably assign employees a technology budget based on work location attributes and job attributes and for intelligent monitors that examine an employee's work patterns. The embodiments of the invention address this need by providing a system and method to intelligently manage a technology budget for a mobile employee. The embodiments of the invention also generate a budget based on attributes about the employee and their work environment. Moreover, the system and method provided by the embodiments of the invention allow a mobile employee to select corporate approved technologies from a technology cafeteria plan. With a budget, the mobile employee knows how much he/she can spend, and has the latitude and a partial autonomy over his/her own budget. Referring now to the drawings and more particularly to FIGS. 1 through 4 where similar reference characters denote corresponding features consistently throughout the figures, there are shown preferred embodiments of the invention.

Figure 1:
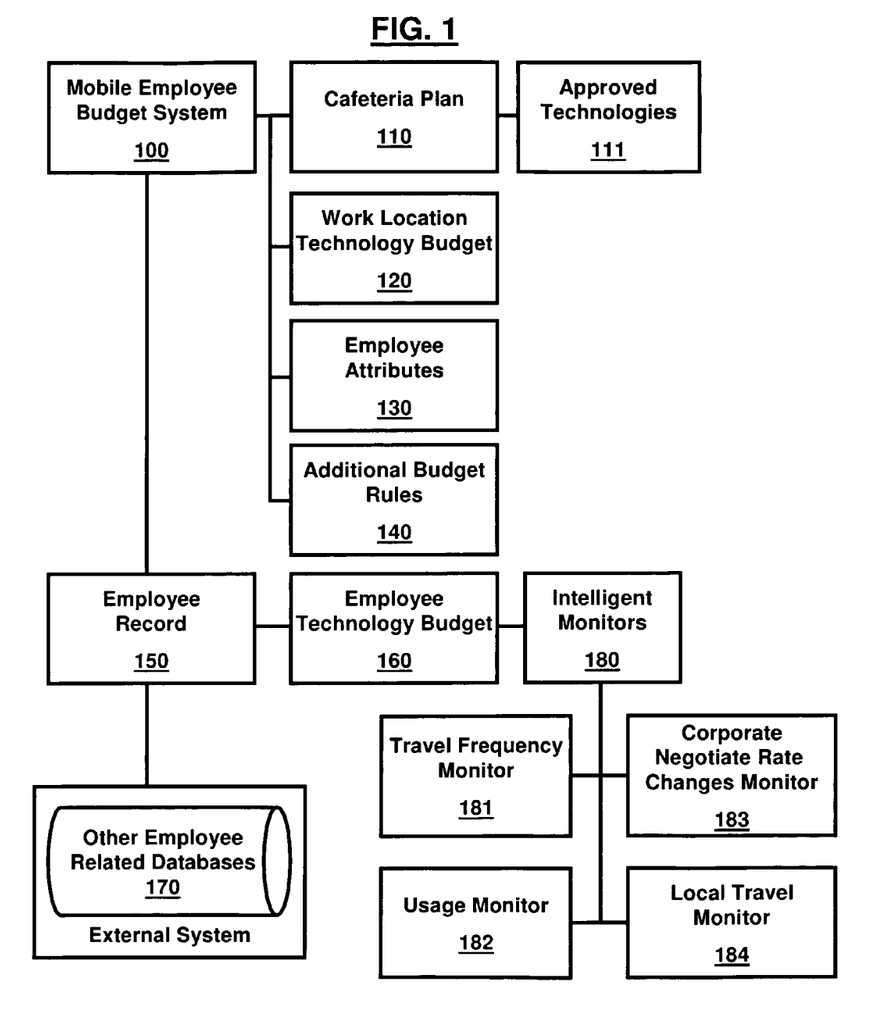
FIG. 1 is a schematic diagram of a mobile employee budget system according to an embodiment of the invention.

FIG. 1 illustrates a mobile employee budget system 100 according to an embodiment of the invention. The mobile employee budget system 100 comprises a cafeteria plan component 110 (which may be embodied as a computerized database), which includes a management approved list 111 of mobile technologies that the mobile workforce may use and expense. Preferably, the management tests the various mobile technologies prior to approving them in order to assure compatibility of the mobile technologies with the needs of the mobile employees. The mobile employee budget system 100 also includes a work location technology budget component 120. In this regard, the management assigns a work location code to each employee based on where they spend most of their time. Examples of work location codes include: "T" for Traveler, "H" for Work at Home, "S" for Standard Office. The management defines a base technology budget for each work location code that starts to define how much an employee may expense for these tools. A standard office location would start with a zero or a very limited budget because most expenses are covered by the company in-house. Comparatively, a mobile employee or "work at home" location would start with a larger budget to cover expenses that occur to enable a mobile employee to be effective and productive.

Next, the mobile employee budget system 100 includes an employee attributes component 130, whereby the management defines attributes they want to define for an employee that would impact the technology budget 120. Attribute examples include the skill level of the employee, years with the company, job code, etc. Each of these attributes can then be defined with a budget percentage increase to change the base work location technology budget 120 for a mobile employee. For example, an employee who is a senior technical staff member with 20 years of experience should presumably be allotted a larger budget than an employee who is a recent college graduate having less than 6 months of experience.

The mobile employee budget system 100 further includes an additional budget rules component 140, wherein the management may want to define additional rules to impact the overall technology budget. An example of a rule is, "for every patent an employee creates, they get an additional one percent budget increase for a year." In another example of a rule, "employees that travel internationally receive additional budget allowances to cover roaming charges for their cell phone use."

Additionally, the mobile employee budget system 100 includes an employee record component 150, which is a collection of all of the employees attributes 130, which is then stored in a system database 170. The employee record component 150 receives updates from an external human resource system (part of system database 170) each month and tracks the remaining budget total either yearly or monthly based on corporate requirements. To determine the remaining budget allowed to be spent, the employee record component 150 monitors how much the system 100 pays the employee for expense reports. If an employee exceeds his/her budget, the employee must follow the expense report exception process 205 (described in FIG. 2) to justify any expenses over their allocated budget.

Again, with reference to FIG. 1, the employee record component 150 includes an employee technology budget component 160. The employee technology budget 160 is set based on the work location technology budget 120, employee attributes 130, additional budget rules 140, and the employee record 150. That is, the employee technology budget 160 is based on the various factors affecting the status of the employee (i.e., technology needs of the employee as defined by the cafeteria plan 110, the employee's experience and other attributes 130, additional rules 140 affecting a particular employee, and the standard (i.e., objective standard) assigned to a particular employee's position and technology budget criteria in light of his/her work location (i.e., work location technology budget 120)). Furthermore, the employee technology budget component 160 can be updated when changes occur in the employee attributes 130 and when intelligent monitors 180 determine the employees' work activity justify an increase or decrease in the employee technology budget 160. The system 100 updates the employee technology budget 160 periodically, which can be performed monthly or yearly, or project to project based on the preferences or policies of the business/organization.

The intelligent monitors 180 include a travel frequency monitor 181, a usage monitor 182, a corporate negotiated rates changes monitor 183, and a local travel monitor 184. The travel frequency monitor 181 tracks the frequency that the employee travels. Based on the rules defined in the additional budget rules 140, the system 100 may update the employee technology budget 160 if the travel frequency monitor indicates an increase/decrease in the employee's travel frequency. The travel frequency monitor 181 monitors employee expense reports 201 (of FIG. 2) for travel related expenses to determine if adjustments should be made.

In FIG. 1, the usage monitor 182 tracks the employee's use of wireless voice and data usage and makes changes to the employee technology budget 160 based on rules in the additional budget rules component 140. If the employee is not using a flat rate service, the minute plan may need to be increased or decreased based on usage; i.e., if many customer calls are coming into the employee's cell phone and is using more minutes than are being paid for in the standard plan, the system 100 increases the technology budget 160 and recommends a plan change. Accordingly, it is assumed that the employee reports actual usage of voice and data on the expense report 201 (of FIG. 2).

With reference to FIG. 1, the corporate negotiated rate changes monitor 183 tracks contracts that the business negotiates with service providers. When rate reductions are realized, the system 100 automatically adjusts the employee technology budget 160 accordingly. Likewise when rate increases occur, the system 100 automatically adjusts the employee technology budget 160 accordingly. The local travel monitor 184 can be implemented using two different methods to track how much the employee uses their vehicle for business. A manual system can be used where the employee keeps track of business miles driven and expenses them using the expense reporting process 201 (of FIG. 2). The local travel monitor 184 would monitor for these local travel expenses and adjust the employee technology budget as necessary. An alternative would be to use an on-board vehicular computer system (not shown) to automatically record and report business usage of the vehicle (not shown). When an employee uses their vehicle, they indicate to the computer system (not shown) that the trip is for business. At the end of the trip, an on-board computer system (not shown) passes a message to the system 100 for analysis and expense reporting. The local travel monitor 184 would monitor for these local travel expenses and adjust the employee technology budget as necessary.

Figure 2:
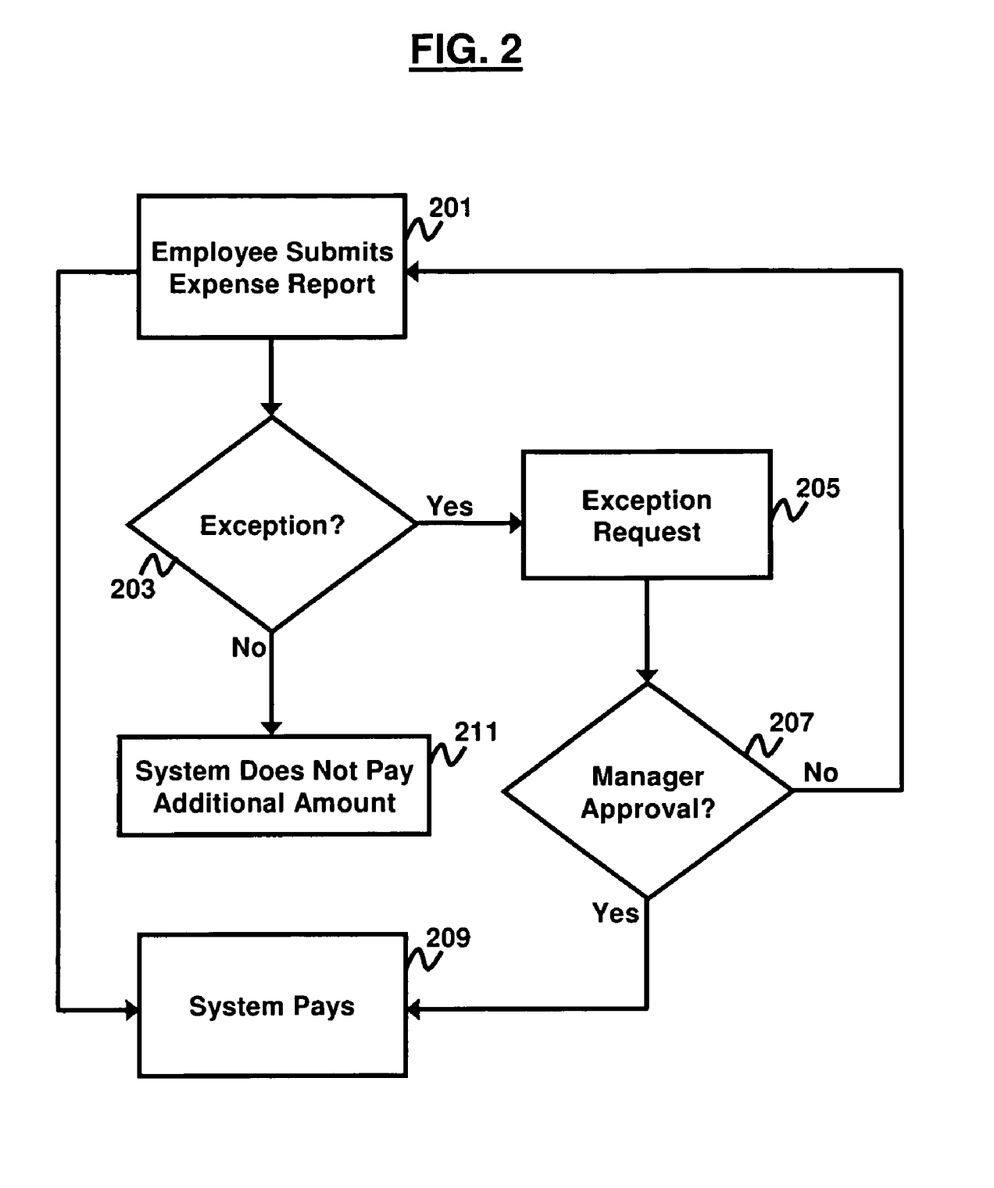
FIG. 2 is a flow diagram of a mobile expense report process according to an embodiment of the invention.

FIG. 2, with reference to FIG. 1, illustrates an expense reporting process according to an embodiment of the invention. The expense reporting process may involve the employee seeking reimbursement for any personal resources (i.e., employee's personal resources such as money, personal credit card, personal automobile, house, etc.) used by the employee during the performance of work-related duties. According to the process, the employee submits (201) expense reports to be reimbursed for expenses incurred while conducting business for the business/organization. The system 100 then pays (209) the employee for the requested amount in the expense report. If the employee believes they should be reimbursed for more than their allocated employee technology budget 160, they may seek to determine whether an exception (203) should be made and that they should be reimbursed for the additional amount. If there is no exception ('No'), then the system 100 does not pay (211) the additional amount. If there is an exception ('Yes'), then the employee makes an exception request (205) and it then goes to manager approval (207) of the request. If the manager approves ('Yes') the exception request, then the system 100 pays (209) the employee's reimbursement request or issues cash funds to the employee. If the manager does not approve ('No') the exception request, then, then the employee has the option of resubmitting (201) the expense report. The system 100 then updates the employee record to indicate the remaining budget available.

For some businesses/organizations the expense reporting process can be operated using a simple e-mail work-flow process. The employee begins the expense reporting process (201) by sending a correspondence (i.e., e-mail) requesting reimbursement to their manager. The manager can approve and forward the correspondence (e-mail) to the individual responsible for reimbursing funds to the employee. These funds may be sent directly to the employee's back account, or added to their next pay check, or a check may be issued to the employee, etc.

Figure 3A:
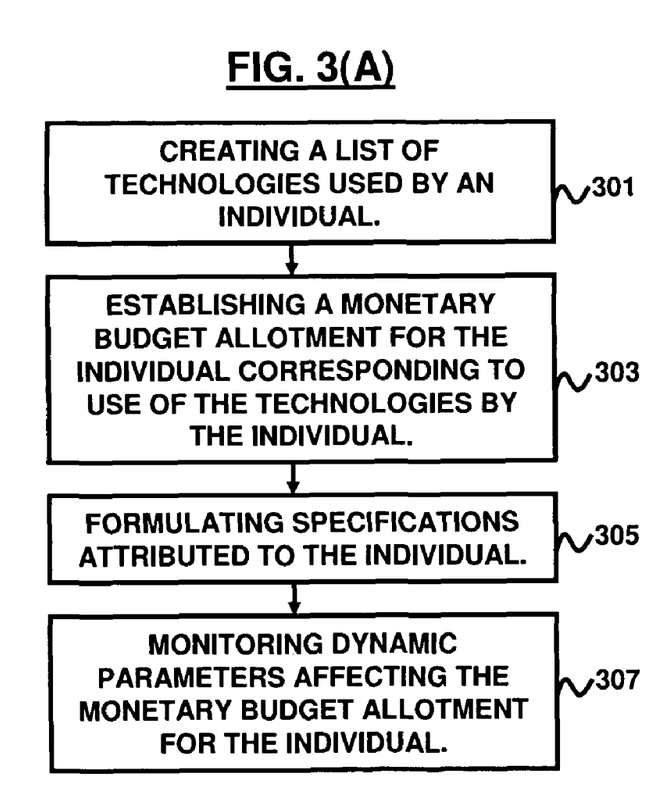
FIGS. 3(A) through 3(C) are flow diagrams illustrating preferred methods of an embodiment of the invention.

FIG. 3(A) is a flowchart illustrating a method for budgeting technology expenses for an individual based on an objective standard using a computer system, wherein the method comprises creating (301) a list of technologies used by the individual; establishing (303) a monetary budget allotment for the individual corresponding to use of the technologies by the individual; formulating (305) specifications attributed to the individual, wherein the specifications comprise rules for defining the monetary budget allotment for the individual; and monitoring (307) dynamic parameters affecting the monetary budget allotment for the individual, wherein the individual comprises a mobile employee performing work-related duties for an organization. Work-related duties may include anything the employee does for the purposes of carrying out the duties described in a job description for that particular employee, as defined by the management.

Figure 3B:
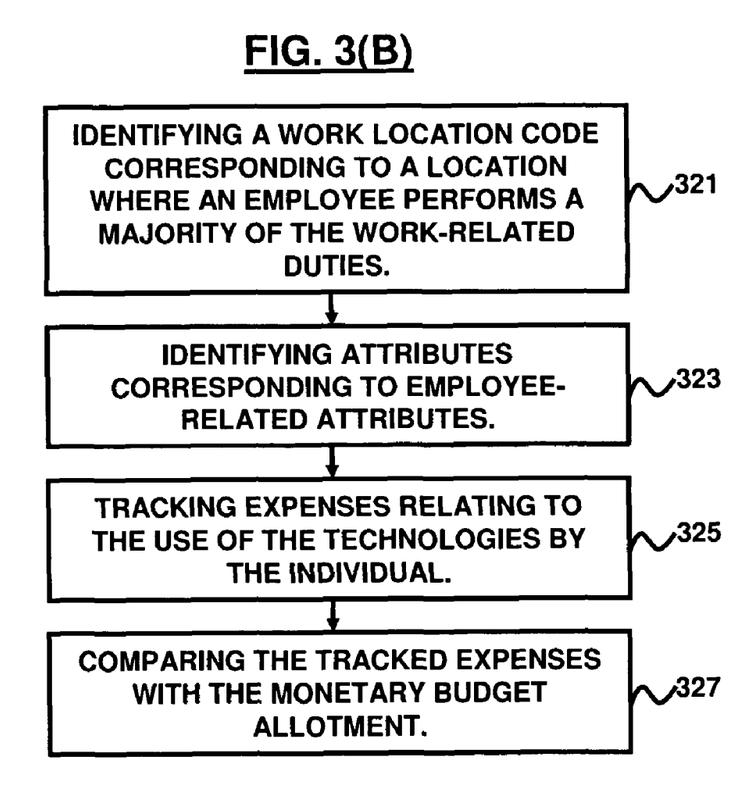

As shown in FIG. 3(B), the method further comprises identifying (321) a work location code corresponding to a location where the employee performs a majority of the work-related duties; identifying (323) attributes corresponding to employee-related attributes including any of employee skill level, years of service with the organization, and job classification; tracking (325) expenses relating to the use of the technologies by the individual; and comparing (327) the tracked expenses with the monetary budget allotment.

Figure 3C:
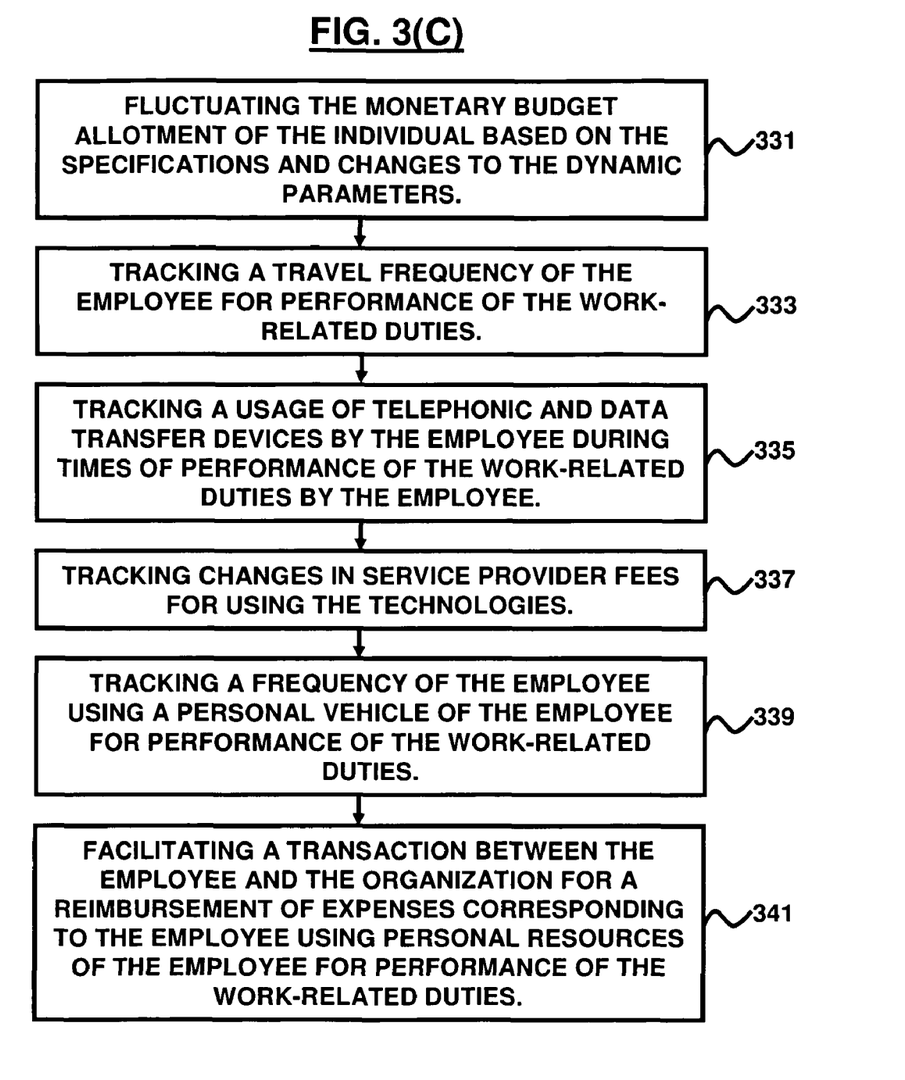

Moreover, as illustrated in FIG. 3(C), the method comprises fluctuating (331) the monetary budget allotment of the individual based on the specifications and changes to the dynamic parameters; tracking (333) a travel frequency of the employee for performance of the work-related duties; tracking (335) a usage of telephonic and data transfer devices by the employee during times of performance of the work-related duties by the employee; tracking (337) changes in service provider fees for using the technologies; tracking (339) a frequency of the employee using a personal vehicle of the employee for performance of the work-related duties; and facilitating (341) a transaction between the employee and the organization for a reimbursement of expenses corresponding to the employee using personal resources of the employee for performance of the work-related duties.

Figure 4:
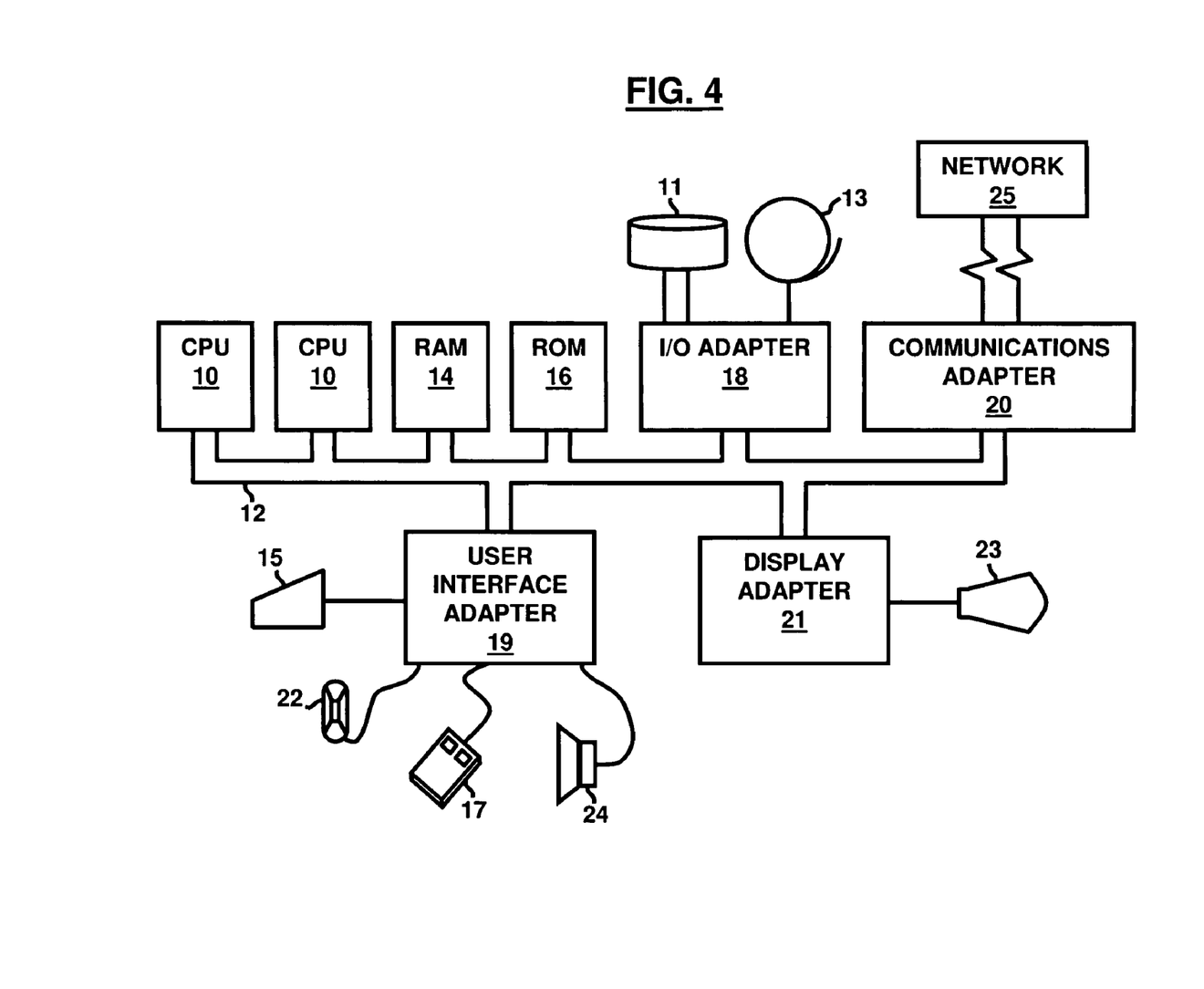
FIG. 4 is a schematic diagram of a computer system according to an embodiment of the invention.

A representative hardware environment for practicing the embodiments of the invention is depicted in FIG. 4. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments of the invention achieve several advantages including that the employee knows how much they can expense for technology tools and services; the business can plan a more effective budget for their employees; budget allocations are more equitable because of the use of an objective tool rather than a subjective process; and the use of monitors 180 (i.e., software agents) that track patterns which then adjust budgets 160 according to policies.

The system 100 provided by the embodiments of the invention could be marketed by a company's internal human resources department as a benefit to recruit new employees. This would be viewed as a positive benefit that the company is allowing the employee to invest in technology to perform their job done while at the same time introducing a potential savings to the business/organization. Moreover, the system 100 provided by the embodiments of the invention together with all of its components (as illustrated in FIG. 1) may include computer logic circuitry adapted and programmed to perform the various functions described above.

The embodiments of the invention change the typical subjective means of managing budgets found in conventional approaches to a very objective technique that can be automated through the triggers described in the description. The conventional approaches have generally not tread in the solution provided by the embodiments of the invention because most companies/business entities have consisted of traditional office workers (i.e., non-mobile employees). The embodiments of the invention were developed to address a recent phenomena whereby companies are now moving towards a much larger portion of nontraditional or mobile workers (upwards of 40% in some cases). This shift has created a need to allow much greater flexibility in supporting these mobile workers from a services stand-point and associated budget.

Accordingly, the solution provided by the embodiments of the invention has not been addressed before because (1) there has not been a need in the past given the high percentage of traditional office workers as discussed above; and (2) the means of automating with objective information the association of personalized needs with an appropriate budget has been far too complex in the past. Further budgets are typically static in nature. Once a budget is set it does not change very often and employees work to stay within their expense budgets. Thus, the embodiments of the invention create a dynamic aspect to budgets based on objective data collected about the employee rather than subjective approaches indicative of conventional solutions.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the embodiments of the invention can be practiced with modification within the spirit and scope of the appended claims.

What is claimed is:

1. An automated system for budgeting technology expenses for an individual based on an objective standard, said system comprising:
    a database comprising a list of a plurality of technologies used by said individual;
    a controller connected to said database, said controller being adapted to establish a monetary budget allotment for said individual corresponding to:
        use of said plurality of technologies by said individual;
        work location attributes of said individual;
        job attributes of said individual; and computer device monitoring of work behavior patterns of said individual, at least one data component connected to said controller, said data component comprising specifications attributed to said individual, wherein said specifications comprise rules for defining said monetary budget allotment for said individual; and at least one monitor connected to said controller, said monitor being adapted to track dynamic parameters affecting said monetary budget allotment for said individual, said list of said plurality of technologies used by said individual comprise tools and services including
a communication device,
a wireless communication network for said communication device,
a data computing device, and
one of a wireless data network and a wired data network for said data computing device, and said monitor tracking a usage of communication and data transfer and changes in service provider fees on said wireless communication network and one of said wireless data network and said wired data network for using said plurality of technologies during times of performance of said work-related duties by said employee.

2. The system of claim 1, wherein said individual comprises an employee performing work-related duties for an organization.

3. The system of claim 2, wherein said employee comprises a mobile employee.

4. The system of claim 2, wherein said data component comprises a location component comprising a work location code identifier corresponding to a location where said employee performs a majority of said work-related duties.

5. The system of claim 2, wherein said data component comprises an attributes identifier corresponding to employee-related attributes including any of employee skill level, years of service with said organization, and job classification.

6. The system of claim 1, further comprising an individual record component adapted to track expenses relating to said use of said plurality of technologies by said individual and to compare the tracked expenses with said monetary budget allotment.

7. The system of claim 1, wherein said controller is adapted to fluctuate said monetary budget allotment of said individual based on said specifications and changes to said dynamic parameters.

8. The system of claim 2, wherein said monitor comprises a travel monitor adapted to track a travel frequency of said employee for performance of said work-related duties.

9. The system of claim 2, wherein said monitor comprises a travel monitor adapted to track a frequency of said employee using a personal vehicle of said employee for performance of said work-related duties.

10. The system of claim 2, further comprising an expense reporting component connected to said monitor, wherein said expense reporting component being adapted to facilitate a transaction between said employee and said organization for a reimbursement of expenses corresponding to said employee using personal resources of said employee for performance of said work-related duties.

11. A computer-implemented method for budgeting technology expenses for an individual based on an objective standard using a computer system, said method comprising:

creating, by a computing device, a list of a plurality of technologies used by said individual;

establishing, by said computing device, a monetary budget allotment for said individual corresponding to:
use of said plurality of technologies by said individual;
work location attributes of said individual;
job attributes of said individual; and
computer device monitoring of work behavior patterns of said individual, formulating, by said computing device, specifications attributed to said individual, wherein said specifications comprise rules for defining said monetary budget allotment for said individual; and monitoring, by said computing device, dynamic parameters affecting said monetary budget allotment for said individual, said list of said plurality of technologies used by said individual comprise tools and services including
a communication device,
a wireless communication network for said communication device,
a data computing device, and
one of a wireless data network and a wired data network for said data computing device, and said monitor tracking a usage of communication and data transfer and changes in service provider fees on said wireless communication network and one of said wireless data network and said wired data network for using said plurality of technologies during times of performance of said work-related duties by said employee.

12. The method of claim 11, wherein said individual comprises an employee performing work-related duties for an organization.

13. The method of claim 12, wherein said employee comprises a mobile employee.

14. The method of claim 12, further comprising:
identifying, by said computing device, a work location code corresponding to a location where said employee performs a majority of said work-related duties.

15. The method of claim 12, further comprising:
identifying, by said computing device, attributes corresponding to employee-related attributes including any of employee skill level, years of service with said organization, and job classification.

16. The method of claim 11, further comprising:
tracking, by said computing device, expenses relating to said use of said plurality of technologies by said individual; and
comparing, by said computing device, the tracked expenses with said monetary budget allotment.

17. The method of claim 11, further comprising:
fluctuating, by said computing device, said monetary budget allotment of said individual based on said specifications and changes to said dynamic parameters.

18. The method of claim 12, further comprising:
tracking, by said computing device, a travel frequency of said employee for performance of said work-related duties.

19. The method of claim 12, further comprising:
tracking, by said computing device, a frequency of said employee using a personal vehicle of said employee for performance of said work-related duties.

20. The method of claim 12, further comprising:
facilitating, by said computing device, a transaction between said employee and said organization for a reimbursement of expenses corresponding to said employee using personal resources of said employee for performance of said work-related duties.

21. A non-transitory storage medium readable by computer, tangibly embodying a program of instructions executable by said computer to perform a method of budgeting technology expenses for an individual based on an objective standard using a computer system, said method comprising:
creating a list of a plurality of technologies used by said individual;
establishing a monetary budget allotment for said individual corresponding to:
use of said plurality of technologies by said individual;
work location attributes of said individual;
job attributes of said individual; and
computer device monitoring of work behavior patterns of said individual,
formulating specifications attributed to said individual, wherein said specifications comprise rules for defining said monetary budget allotment for said individual; and
monitoring dynamic parameters affecting said monetary budget allotment for said individual,
said list of said plurality of technologies used by said individual comprise tools and services including
a communication device,
a wireless communication network for said communication device,
a data computing device, and
one of a wireless data network and a wired data network for said data computing device, and
said monitoring further comprising tracking a usage of communication and data transfer and changes in service provider fees on said wireless communication network and one of said wireless data network and said wired data network for using said plurality of technologies during times of performance of said work-related duties by said employee.

22. The non-transitory storage medium of claim 21, wherein said individual comprises an employee performing work-related duties for an organization.

23. The non-transitory storage medium of claim 22, wherein said employee comprises a mobile employee.

24. The non-transitory storage medium of claim 22, wherein said method further comprises identifying a work location code corresponding to a location where said employee performs a majority of said work-related duties.

25. The non-transitory storage medium of claim 22, wherein said method further comprises identifying attributes corresponding to employee-related attributes including any of employee skill level, years of service with said organization, and job classification.

26. The non-transitory storage medium of claim 21, wherein said method further comprises:
tracking expenses relating to said use of said plurality of technologies by said individual; and
comparing the tracked expenses with said monetary budget allotment.

27. The non-transitory storage medium of claim 21, wherein said method further comprises fluctuating said monetary budget allotment of said individual based on said specifications and changes to said dynamic parameters.

28. The non-transitory storage medium of claim 22, wherein said method further comprises tracking a travel frequency of said employee for performance of said work-related duties.

29. The non-transitory storage medium of claim 22, wherein said method further comprises tracking a frequency of said employee using a personal vehicle of said employee for performance of said work-related duties.

30. The non-transitory storage medium of claim 22, wherein said method further comprises facilitating a transaction between said employee and said organization for a reimbursement of expenses corresponding to said employee using personal resources of said employee for performance of said work-related duties.

31. A computer-implemented method for budgeting technology expenses for an individual based on an objective standard using a computer system, said service:
creating, by a computing device, a list of a plurality of technologies used by said individual;
establishing, by said computing device, a monetary budget allotment for said individual corresponding to:
use of said plurality of technologies by said individual;
work location attributes of said individual;
job attributes of said individual; and
computer device monitoring of work behavior patterns of said individual,
formulating, by said computing device, specifications attributed to said individual, wherein said specifications comprise rules for defining said monetary budget allotment for said individual; and
monitoring, by said computing device, dynamic parameters affecting said monetary budget allotment for said individual,
said list of said plurality of technologies used by said individual comprise tools and services including
a communication device,
a wireless communication network for said communication device,
a data computing device, and
one of a wireless data network and a wired data network for said data computing device, and
said monitoring further comprising tracking a usage of communication and data transfer and changes in service provider fees on said wireless communication network and one of said wireless data network and said wired data network for using said plurality of technologies during times of performance of said work-related duties by said employee.

\* \* \* \* \*